(12) United States Patent
Zhang et al.

(10) Patent No.: US 12,416,751 B2
(45) Date of Patent: Sep. 16, 2025

(54) ULTRA WIDE BAND OPTICAL ABSORBER BASED ON MULTILAYER TRANSITION METAL LAYERS

(71) Applicant: Soochow University, Suzhou (CN)

(72) Inventors: Cheng Zhang, Suzhou (CN); Xiaofeng Li, Suzhou (CN); Haoyu Li, Suzhou (CN); Binglin Huang, Suzhou (CN); Ti Sun, Suzhou (CN); Qinhua Wang, Suzhou (CN)

(73) Assignee: Soochow University, Suzhou (CN)

( * ) Notice: Subject to any disclaimer, the term of this patent is extended or adjusted under 35 U.S.C. 154(b) by 418 days.

(21) Appl. No.: 18/094,412

(22) Filed: Jan. 9, 2023

(65) Prior Publication Data
US 2023/0305205 A1    Sep. 28, 2023

(30) Foreign Application Priority Data
Mar. 23, 2022    (CN) .......................... 202210294478.4

(51) Int. Cl.
*G02B 5/28* (2006.01)
*G02B 5/00* (2006.01)

(52) U.S. Cl.
CPC .............. *G02B 5/281* (2013.01); *G02B 5/003* (2013.01)

(58) Field of Classification Search
CPC .......... G02B 5/281; G02B 5/003; G02B 5/00; G02B 5/28
See application file for complete search history.

(56) References Cited

U.S. PATENT DOCUMENTS

| | | | |
|---|---|---|---|
| 4,282,290 A * | 8/1981 | Pellicori | G02B 5/22 359/359 |
| 9,423,157 B2 * | 8/2016 | Villuendas Yuste | F24S 70/25 |
| 11,267,752 B2 * | 3/2022 | Polcyn | C03C 17/3618 |
| 11,402,557 B2 * | 8/2022 | Wagner | C03C 17/3644 |
| 2008/0088799 A1 | 4/2008 | Kawamura | G03B 21/206 353/20 |
| 2010/0313875 A1 * | 12/2010 | Kennedy | F24S 70/225 126/714 |
| 2011/0249326 A1 * | 10/2011 | Villuendas Yuste | C23C 28/34 359/359 |
| 2015/0267303 A1 * | 9/2015 | Villuendas Yuste | C23C 28/345 427/126.6 |

(Continued)

*Primary Examiner* — Balram T Parbadia
(74) *Attorney, Agent, or Firm* — Hemisphere Law, PLLC; Zhigang Ma

(57) ABSTRACT

An ultra wide band (UWB) optical absorber based on multilayer transition metal layers is provided, and a working band thereof includes a visible-near infrared band or a mid-infrared band; a high reflecting metal film layer, a transition metal film layer and a dielectric film layer are sequentially stacked on a substrate; the high reflecting metal film layer, multilayer transition metal film layers and the dielectric film layer form a planar multilayer structure. The high reflecting metal film layer is used to prevent light transmission, and the combination of the multilayer transition metal film layers and the dielectric film layer reduces the reflection, thus achieving the effect of efficient optical absorption in UWB. The optical absorber can achieve an average absorptivity of more than 92% in the visible-near infrared band of 400-2500 nm, and an average absorptivity of more than 80% in the mid-infrared band of 3-16 μm.

10 Claims, 4 Drawing Sheets

(56) References Cited

U.S. PATENT DOCUMENTS

| | | | |
|---|---|---|---|
| 2016/0082697 A1* | 3/2016 | Hara | C08J 7/044 |
| | | | 428/212 |
| 2016/0146993 A1* | 5/2016 | Kumagai | G02B 5/281 |
| | | | 359/359 |
| 2017/0153045 A1* | 6/2017 | Chung | F24S 70/20 |
| 2021/0053869 A1* | 2/2021 | Dehner | C03C 17/36 |
| 2021/0191017 A1* | 6/2021 | Shen | G02B 5/22 |

* cited by examiner

ULTRA WIDE BAND OPTICAL ABSORBER BASED ON MULTILAYER TRANSITION METAL LAYERS

TECHNICAL FIELD

The disclosure relates to the technical field of optics, in particular to an ultra wide band (UWB) optical absorber based on multilayer transition metal layers, which works in a band of visible light to infrared.

DESCRIPTION OF RELATED ART

UWB optical absorbers working in a visible-infrared band have broad disclosure scenarios. Optical absorbers can be used in many fields, such as communication, sensing, military affairs, environmental monitoring, medical treatment, basic research and so on, depending on the specific wavelength band of absorbed light.

When light (i.e., electromagnetic wave) is incident on metal materials, dielectric materials and semiconductor materials, there will be dielectric loss, hysteresis loss and resistance loss, which will make the electromagnetic energy incident on the object be converted into other forms of energy and consumed. A common optical absorber structure uses the principle of Fabry Perot resonator, and its optical path is a quarter of the wavelength of electromagnetic wave. Based on the principle of multi-beam interference of multiple reflection of electromagnetic waves, electromagnetic waves interfere with one another so as to eliminate and absorb. The thickness of this kind of absorber is usually odd times of a quarter wavelength, which is extremely sensitive to the change of incident angle and polarization state of light, and its working bandwidth is also very narrow. Another common metamaterial absorber is to design a specific wavelength band absorber by designing the top-level sub-wavelength patterned structure. This metamaterial absorber can greatly reduce the film thickness, but it needs photolithography and other technical means, which leads to expensive preparation, limited sample area and limited working bandwidth.

The visible-infrared band is an important band which is widely used in many fields. How to effectively improve the structural design and preparation means of the absorber to achieve the bandwidth expansion, size reduction, cost reduction and large-area preparation of the optical absorber is of great significance to the absorber field.

SUMMARY OF THE DISCLOSURE

In order to solve the defects of narrow absorption band, low absorption efficiency and complex structure of the absorber mentioned above, the purpose of the disclosure is to propose an UWB optical absorber based on multilayer transition metal layers that is insensitive to incident angle. The UWB optical absorber has the advantages of extremely wide absorption band, simple structure, large-area preparation, flexible preparation and insensitivity to structural size errors.

To achieve the above purpose, the disclosure adopts the following technical scheme:

An UWB optical absorber based on multilayer transition metal layers has a working band including a visible-near infrared band or a mid-infrared band, and the UWB optical absorber includes: a substrate and a planar multilayer structure disposed on the substrate; the planar multilayer structure includes a high reflecting metal film layer (i.e., metal film layer with enhanced reflection function) and at least three light absorbing thin film structures disposed on the high reflecting metal film layer, where each of the at least three light absorbing thin film structures includes a transition metal film layer and a dielectric film layer, and a thickness of the transition metal film layer is smaller than that of the dielectric film layer; and a thickness of the UWB optical absorber is less than 3000 nanometers (nm).

Preferably, a material of the transition metal film layer includes at least one selected from a group consisting of titanium (Ti), chromium (Cr) and platinum (Pt).

Preferably, a material of the dielectric film layer includes one selected from a group consisting of magnesium fluoride ($MgF_2$) and silicon oxide ($SiO_2$).

Preferably, a material of the high reflecting metal film layer includes at least one selected from a group consisting of aurum (Au), aluminum (Al) and chromium (Cr); and a thickness of the high reflecting metal film layer is greater than 50 nm.

Preferably, the working band of the UWB optical absorber is the visible-near infrared band, and the thickness of the UWB optical absorber is less than 500 nm, the planar multilayer structure includes three light absorbing thin film structures which are stacked in sequence, and the planar multilayer structure is configured as the high reflecting metal film layer, a first transition metal film layer, a first dielectric film layer, a second transition metal film layer, a second dielectric film layer, a third transition metal film layer and a third dielectric film layer sequentially stacked in that order; and a thickness of the first transition metal film layer is larger than that of the second transition metal film layer and larger than that of the third transition metal film layer.

Preferably, a material of the first transition metal film layer is Ti, and a thickness of the first transition metal film layer is in a range of 40 nm to 70 nm;

a material of the first dielectric film layer is $MgF_2$, and a thickness of the first dielectric film layer is in a range of 90 nm to 110 nm;

a material of the second transition metal film layer is Ti, and a thickness of the second transition metal film layer is in a range of 10 nm to 13 nm;

a material of the second dielectric film layer is $MgF_2$, and a thickness of the second dielectric film layer is in a range of 110 nm to 130 nm;

a material of the third transition metal film layer is Ti, and a thickness of the third transition metal film layer is in a range of 4 nm to 7 nm;

a material of the third dielectric film layer is $MgF_2$, and a thickness of the third dielectric film layer is in a range of 90 nm and 110 nm.

Preferably, the working band of the UWB optical absorber is the mid-infrared band, and the thickness of the UWB optical absorber is less than 3000 nm;

the planar multilayer structure includes three light absorbing thin film structures, and the planar multilayer structure is configured as the high reflecting metal film layer, a seventh dielectric film layer, a fourth light absorbing thin film structure, an eighth dielectric film layer, a fifth light absorbing thin film structure, a sixth light absorbing thin film structure and a ninth dielectric film layer sequentially stacked in that order.

Preferably, a material of the seventh dielectric film layer is $MgF_2$, and a thickness of the seventh dielectric film layer is in a range of 850 nm to 910 nm;

a material of a fourth transition metal film layer of the fourth light absorbing thin film structure is Ti, and a thickness of the fourth transition metal film is in a range of 15 nm to 20 nm;

a material of a fourth dielectric film layer of the fourth light absorbing thin film structure is $MgF_2$, and a thickness of the fourth dielectric film layer is in a range of 900 nm to 1000 nm;

a material of the eighth dielectric film layer is tantalic oxide ($Ta_2O_5$), and a thickness of the eighth dielectric film layer is in a range of 120 nm to 160 nm;

a material of a fifth transition metal film layer of the fifth light absorbing thin film structure is Ti, and a thickness of the fifth transition metal film layer is in a range of 15 nm to 20 nm;

a material of a fifth dielectric film layer of the fifth light absorbing thin film structure is $Ta_2O_5$, and a thickness of the fifth transition metal film layer is in a range of 600 nm to 650 nm;

a material of a sixth transition metal film layer of the sixth light absorbing thin film structure is Ti, and a thickness of the sixth transition metal film layer is in a range of 4 nm to 5 nm;

a material of a sixth dielectric film layer of the sixth light absorbing thin film structure is silicon nitride ($Si_3N_4$), and a thickness of the sixth dielectric film layer is in a range of 750 nm to 850 nm; and a material of the ninth dielectric film layer is $MgF_2$, and a thickness of the ninth dielectric film layer is in a range of 800 nm to 900 nm.

Preferably, the substrate includes one selected from a group consisting of silicon slices, $SiO_2$ glass, polished Al slices and polyethylene glycol terephthalate (PET) plastic.

Preferably, in the design of the UWB optical absorber based on multilayer transition metal layers, the material and thickness of each layer in the planar multilayer structure are designed with the objective that the equivalent optical admittance of the planar multilayer structure is equal to the optical admittance of the air; and the planar multilayer structure is deposited on a surface of the substrate by vacuum coating.

The absorptivity formula of the UWB optical absorber based on the multilayer transition metal layers is: A=1−R−T, the reflectivity formula is described by optical admittance:

$$R = \left| \frac{Y_0 - Y_{end}}{Y_0 + Y_{end}} \right|^2,$$

where $Y_0$ and $Y_{end}$ are respectively the optical admittance values of the air and the UWB optical absorber, $Y_{end}=H_a/E_a$, where $H_a$ and $E_a$ are respectively the magnetic field component and electric field component at an interface between the air and the UWB optical absorber, a bottom layer of the UWB optical absorber is the high reflecting metal with a transmissivity of T=0, so the equivalent optical admittance of the UWB optical absorber should be as close as possible to the optical admittance of the air. When designing the UWB optical absorber based on multilayer transition metal layers, the material and thickness of each layer in the planar multilayer structure are designed with the objective that the equivalent optical admittance of the planar multilayer structure is equal to the optical admittance of the air; By means of vacuum coating, the planar multilayer structure can be deposited on the surface of the substrate to obtain the UWB optical absorber.

Compared with the related art, beneficial effects of the disclosure are as follows.

The UWB optical absorber provided by the embodiment of the disclosure has excellent UWB absorption performance. The UWB optical absorber with the visible-near infrared band has an average absorption rate of more than 92% at the wavelength of 400~2500 nm, and an average absorption rate still exceeds 84% when the incident angle is greater than 68°; The UWB optical absorber with the mid-infrared band has an average absorption rate of more than 80% at the wavelength of 3~16 micrometres μm).

In addition, the UWB optical absorber provided by the embodiment of the disclosure has a simple structure, and does not need complicated photolithography technology. The area of the prepared absorber only depends on the size of the chamber during vacuum coating, and the performance of the absorber is little affected by the processing accuracy, so it has practical value for large-area preparation. The optical absorber made of the planar multilayer thin film structure is insensitive to polarization and incident angle. The requirement of technological precision is low, and flat and clean flexible materials can be used, which has the potential value of preparing flexible optical absorbers.

DETAILED DESCRIPTION OF EMBODIMENTS

The above scheme will be further explained with reference to the following specific embodiments. It should be understood that these embodiments are used to illustrate the disclosure and are not limited to the scope of the disclosure. The implementation conditions adopted in the embodiments can be further adjusted as the conditions of specific manufacturers, and the implementation conditions not indicated are usually those in routine experiments.

The embodiment of the disclosure provides an UWB optical absorber based on multilayer transition metal layers, the working band of which includes a visible-near infrared band or a mid-infrared band, the UWB optical absorber includes a substrate, a planar multilayer structure arranged on the substrate, where the planar multi-layer structure includes a high reflecting metal film layer and at least three light absorbing thin film structures arranged on the high reflecting metal film layer, and each the light absorbing thin film structure includes a transition metal film layer and a dielectric film layer, and a thickness of each the transition metal film layer is smaller than that of the dielectric film layer. Through this design, the structural design and preparation means of the absorber can be effectively improved to achieve the bandwidth expansion, cost reduction and large-area preparation of the optical absorber, which is of great significance to the absorber field.

Embodiment 1

Figure 1:
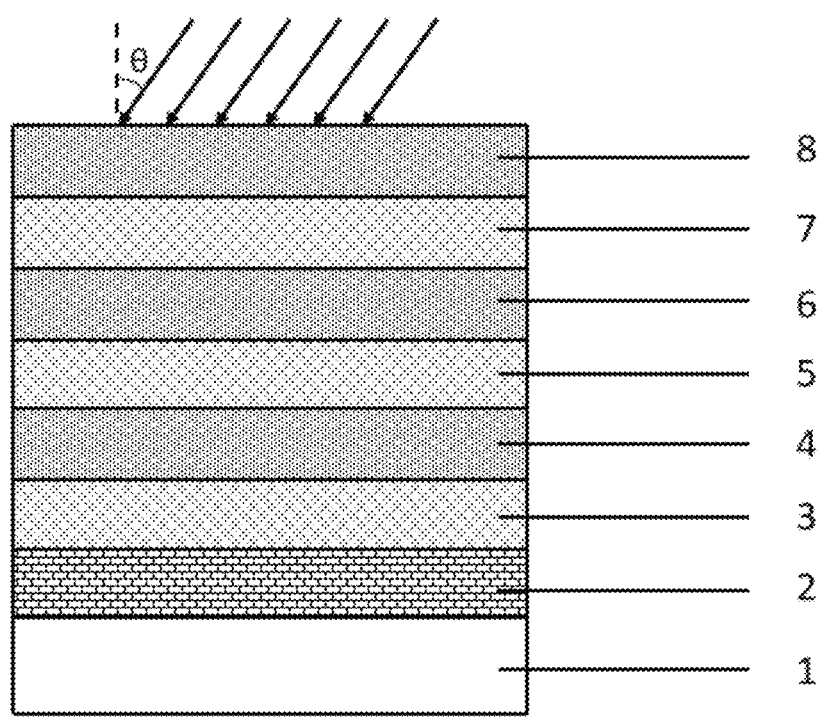
FIG. 1 illustrates a cross-sectional view of a structure of an UWB optical absorber with a visible-near infrared band according to an embodiment of the disclosure; in which: 1, substrate; 2, high reflecting metal film layer; 3, first transition metal film layer; 4, first dielectric film layer; 5, second transition metal film layer; 6, second dielectric film layer; 7, third transition metal film layer; 8, third dielectric film layer.

FIG. 1 shows an UWB optical absorber based on multi-layer transition metal layers provided in the disclosure. The working band of the UWB optical absorber is the visible-near infrared band.

The UWB optical absorber includes three light absorbing thin film structures, namely: a first light absorbing thin film structure, a second light absorbing thin film structure and a third light absorbing thin film structure. The first light absorbing thin film structure includes a first transition metal film layer and a first dielectric film layer. The second light absorbing thin film structure includes a second transition metal film layer and a second dielectric film layer. The third light absorbing thin film structure includes a third transition metal film layer and a third dielectric film layer.

The UWB optical absorber is configured as a planar multilayer structure, which includes a substrate 1, a high reflecting metal film layer 2, a first transition metal film layer 3, a first dielectric film layer 4, a second transition metal film layer 5, a second dielectric film layer 6, a third transition metal film layer 7, and a third dielectric film layer 8 which are sequentially stacked in that order.

In actual preparation, a silicon (Si) slice with a 500 μm thickness (such as a 2-inch polished Si slice) is used as the substrate 1. Then, a certain thickness (e.g., 80 nm thickness) of Au as the high reflecting metal film, a certain thickness (e.g., 62 nm thickness) of Ti as the first transition metal film, a certain thickness (e.g., 98 nm thickness) of $MgF_2$ as the first dielectric film layer, a certain thickness (e.g., 11.2 nm thickness) of Ti as the second transition metal film layer, a certain thickness (e.g., 118 nm thickness) of $MgF_2$ as the second dielectric film layer, a certain thickness (e.g., 5.4 nm thickness) of Ti as the third transition metal film, and a certain thickness (e.g., 102 nm thickness) of $MgF_2$ as the third dielectric film layer are sequentially deposited on the substrate 1 from bottom to top. In this embodiment, the substrate is the silicon slice. In other embodiments, the substrate can be the $SiO_2$ glass, polished Al slice or PET plastic.

Next, the preparation method of the above-mentioned UWB optical absorber with the visible-near infrared band is described, and the preparation method is as follows:

1) An adhesive layer is deposited on a substrate, and a high reflecting metal film layer of Au (i.e., Au high reflecting metal film layer) is deposited on the adhesive layer. In this process, a polished Si slice, or $SiO_2$ glass, or polished Al slice, or PET plastic after ultrasonic cleaning with acetone, ethanol and deionized water is selected as the substrate. Thermal evaporation technique is used to deposit 5 nm metal Ti as the adhesive layer, and then the Au high reflecting metal film layer with a thickness of more than 80 nm is deposited (a film thickness is monitored by the quartz crystal oscillating thickness gauge). The vacuum degree of deposition is $5 \times 10^{-4}$ pascals (Pa); Preferably, the thickness of the high reflecting metal film layer is in a range of 80 nm to 100 nm.

2) Then, a transition metal layer of Ti (i.e., Ti transition metal layer) with a thickness of 62 nm is deposited on the high reflecting metal film layer by ion beam sputtering technology. Pre-sputtering is performed for 5 min before the deposition of the thin film, and the vacuum degree of deposition is $5 \times 10^{-4}$ Pa. The parameters of the ion beam sputtering includes: target material being Ti target, ion energy being 800 electron volts (eV), ion beam current being 70 milliamperes (mA), argon being introduced during sputtering, and the pressure in the cavity being 0.02 Pa;

2) Then, the ion beam sputtering technique is used to deposit the first dielectric film layer of $MgF_2$ with a thickness of 97.8 nm on the high reflecting metal film layer. Pre-sputtering is performed for 5 min before the deposition of the thin film, and the vacuum degree of deposition is $5 \times 10^{-4}$ Pa. The parameters of the ion beam sputtering includes: the target material being $MgF_2$ target, the ion energy being 800 eV, the ion beam current being 70 mA, the neutralization current being 90 mA, argon being introduced during sputtering, and the pressure in the cavity being 0.02 Pa;

3) a second transition metal film layer is deposited on the first dielectric film layer, where the thickness of the deposited Ti transition metal layer is 11.2 nm, preferably by ion beam sputtering.

4) a second dielectric film layer is deposited on the second transition metal film layer, where the thickness of the deposited $MgF_2$ dielectric film layer is 118 nm, preferably by ion beam sputtering.

5) a third transition metal film layer is deposited on the second dielectric film layer, where the thickness of the deposited Ti transition metal film layer is 5.4 nm, preferably by ion beam sputtering.

6) a third dielectric film layer is deposited on the third transition metal film layer, where the thickness of the deposited $MgF_2$ dielectric film layer is 102 nm, preferably by ion beam sputtering.

Figure 3:
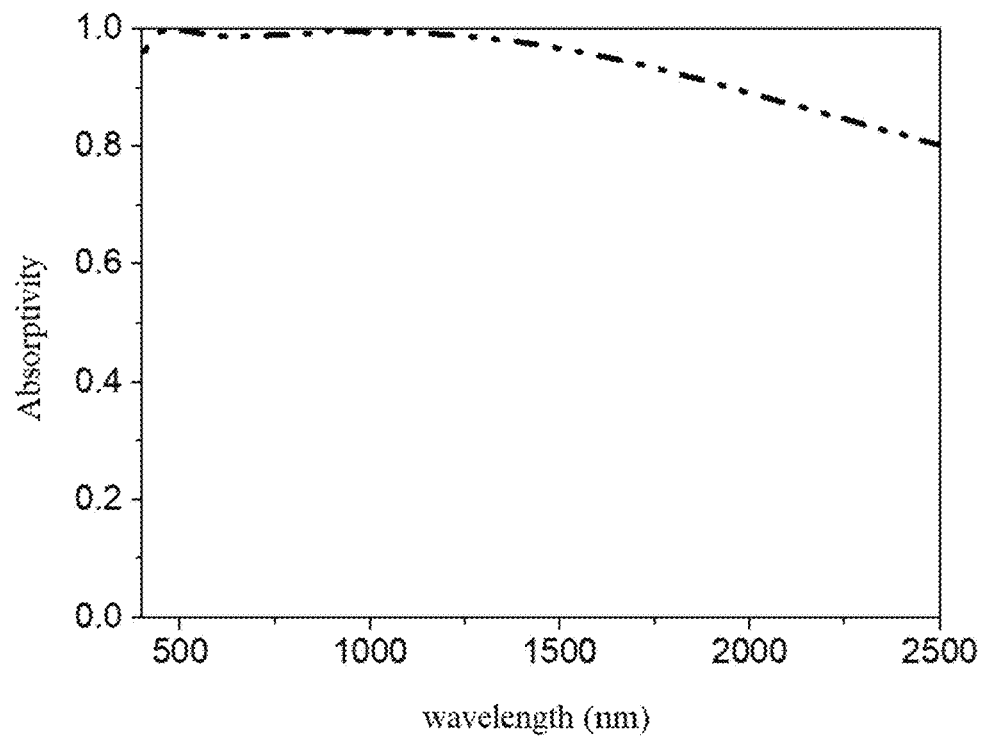
FIG. 3 illustrates an experimental absorption spectrum of an UWB optical absorber with a visible-near infrared band when vertical light is incident according to an embodiment of the disclosure.

The absorption spectrum of the UWB optical absorber with the visible-near infrared band is shown in FIG. 3. It can be seen from FIG. 3 that when the incident light is vertically incident on the UWB optical absorber with the visible-near infrared band, the average absorption rate at the wavelength in a range of 400 nm to 2500 nm (i.e., the visible-near infrared band of 400 nm to 2500 nm) is greater than 92%.

Figure 4:
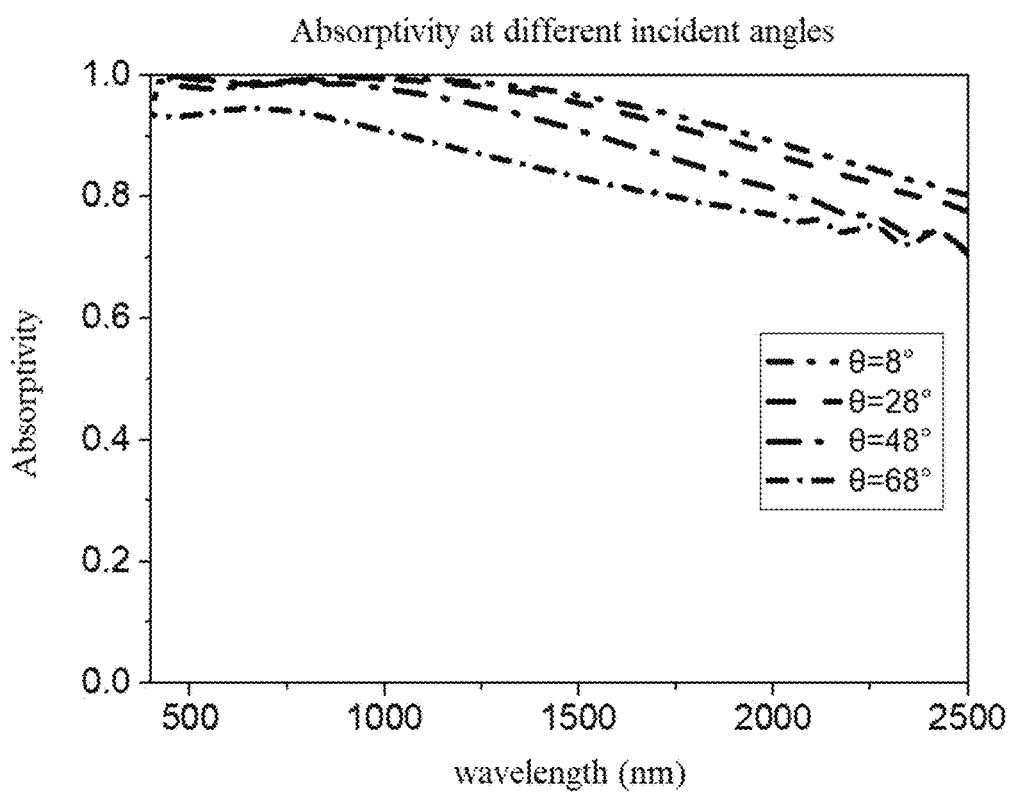
FIG. 4 illustrates an experimental absorption spectrum of an UWB optical absorber with a visible-near infrared band when the angle of incident light is changed according to an embodiment of the disclosure.

Please see FIG. 4 for the absorption spectrum of the UWB optical absorber with the visible-near infrared band that changes with the incident light angle. From FIG. 4, it can be seen that when the incident light angle increases from 0° to 68°, the average absorption rate at the wavelength in a range of 400 nm to 2500 nm is greater than 84%.

Embodiment 2

An UWB optical absorber based on multilayer transition metal layers is provided, and its working band is the visible-near infrared band. The UWB optical absorber in the embodiment has the structure shown in FIG. 1, which is the same as that of Embodiment 1, except that the material of the Au high reflecting metal layer is changed to Cr. The preparation method of the Cr high reflecting metal layer can be one of electron beam evaporation, magnetron sputtering and ion beam sputtering. The remaining steps in the preparation method of the UWB optical absorber with the visible-near infrared band are shown in Embodiment 1.

Embodiment 3

An UWB optical absorber based on multilayer transition metal layers is provided, and its working band is the visible-near infrared band. The UWB optical absorber in the embodiment has the structure shown in FIG. 1, which is the same as that of Embodiment 1, except that the material of the Au high reflecting metal film layer is changed to Al. The preparation method of the Al high reflecting metal film layer can be one of electron beam evaporation, magnetron sputtering and ion beam sputtering, and the remaining steps in the preparation method of the UWB optical absorber with the visible-near infrared band are shown in Embodiment 1.

Embodiment 4

Figure 2:
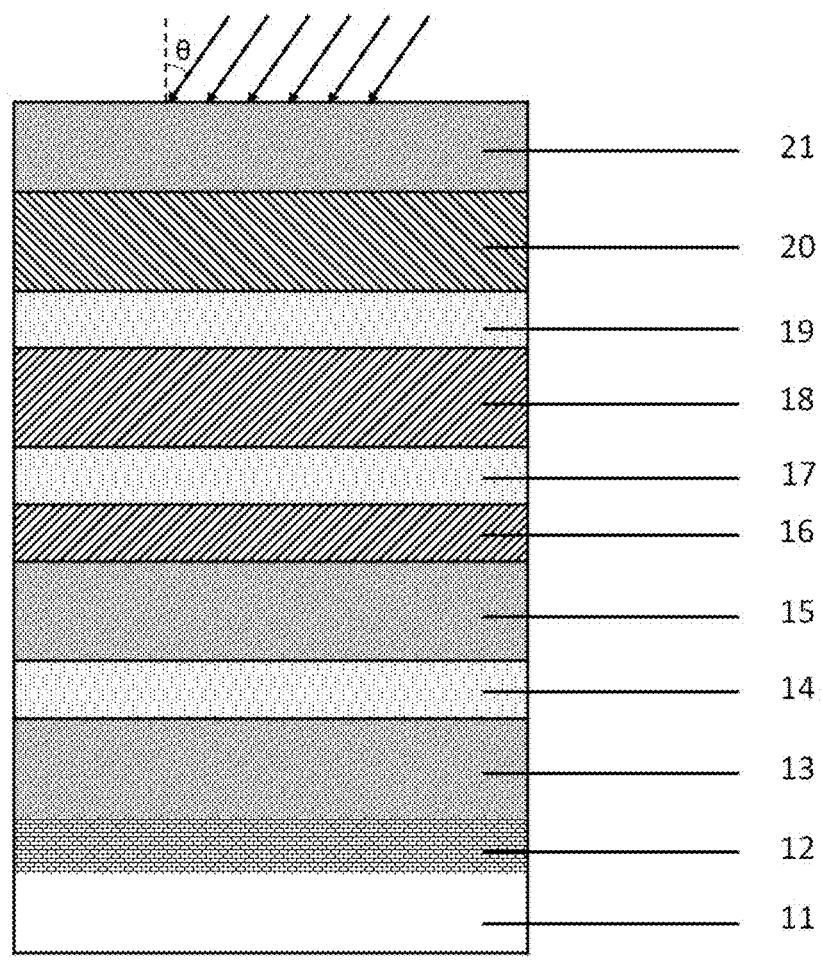
FIG. 2 illustrates a cross-sectional view of a structure of an UWB optical absorber with a mid-infrared band according to an embodiment of the disclosure.

FIG. 2 shows an UWB optical absorber with a mid-infrared band according to another embodiment of the disclosure. The UWB optical absorber is configured as a planar multilayer structure with three light absorbing thin film structures (fourth, fifth and sixth light absorbing thin film structures). The fourth light absorbing thin film structure includes a fourth transition metal film layer and a fourth dielectric film layer, the fifth light absorbing thin film structure includes a fifth transition metal film layer and a fifth dielectric film layer. The sixth light absorbing thin film structure includes: a sixth transition metal film layer and a sixth dielectric film layer.

The UWB optical absorber is combined and includes a planar multilayer structure.

The planar multilayer structure includes a substrate 11, a high reflecting metal film layer 12, a seventh dielectric film layer 13, a fourth transition metal film layer 14, a fourth dielectric film layer 15, an eighth dielectric film layer 16, a fifth transition metal film layer 17, a fifth dielectric film 18, a sixth transition metal film layer 19, a sixth dielectric film layer 20, a ninth dielectric film layer 21 which are sequentially stacked in that order.

In actual preparation, the substrate is a Si slice with 500 μm thickness (such as a 2-inch polished Si slice). A certain thickness (e.g., 5 nm thickness) of a Ti adhesive layer, a certain thickness (e.g., 80 nm thickness) of a Au high reflecting metal film layer, a certain thickness (e.g., 887 nm thickness) of a $MgF_2$ seventh dielectric film layer, a certain thickness (e.g., 18.4 nm thickness) of a Ti fourth transition metal film layer, a certain thickness (e.g., 946 nm thickness) of a $MgF_2$ fourth dielectric film layer, a certain thickness (e.g., 140 nm thickness) of a $Ta_2O_5$ eighth dielectric film layer, a certain thickness (e.g., 18.3 nm thickness) of a fifth transition metal film containing Ti, a certain thickness (e.g., 630 nm thickness) of a fifth dielectric film layer containing $Ta_2O_5$, a certain thickness (e.g., 4.5 nm thickness) of a sixth transition metal film layer containing Ti, a certain thickness (e.g., 811 nm thickness) of a sixth dielectric film layer containing $Si_3N_4$, and a certain thickness (e.g., 833 nm thickness) of a ninth dielectric film layer containing $MgF_2$ are sequentially deposited on the polished Si slice from bottom to top by vacuum coating method.

Next, the preparation method of the UWB optical absorber based on multi-layer transition metal layers (the working band is the mid-infrared band) will be described. The preparation method is as follows:

1) an adhesive layer is deposited on a substrate, an Au high reflecting metal film layer 12 is deposited on the adhesive layer or directly depositing an Al or Cr high reflecting metal film layer 12 on the substrate. In this process, a polished Si slice, or $SiO_2$ glass, or polished Al slice, or PET plastic, which has been ultrasonically cleaned by acetone, ethanol, and deionized water in turn, is selected as the substrate, and the Ti of 5 nm is deposited as the adhesion layer by vacuum coating technology, and then the high reflecting metal film layer of Au is deposited; Preferably, the thickness of the high reflecting metal film is in a range of 80 nm to 100 nm.

2) Then, a seventh dielectric film layer of $MgF_2$ with a thickness of 887 nm is deposited on the Au high reflecting metal film layer by vacuum coating technology.

3) Then, a fourth transition metal film layer of Ti with a thickness of 18.4 nm is deposited on the seventh dielectric film layer of $MgF_2$ by vacuum coating technology.

4) Then, a fourth dielectric film layer of $MgF_2$ with a thickness of 946 nm is deposited on the fourth transition metal film layer of Ti by vacuum coating technology.

5) Then, an eighth dielectric film layer of $Ta_2O_5$ with a thickness of 140 nm is deposited on the fourth dielectric film of $MgF_2$ by vacuum coating technology.

6) Then, a fifth transition metal film layer of Ti with a thickness of 18.3 nm is deposited on the eighth dielectric film layer of $Ta_2O_5$ by vacuum coating technology.

7) Then, a fifth dielectric film layer of $Ta_2O_5$ with a thickness of 630 nm is deposited on the fifth transition metal film layer of Ti by vacuum coating technology.

8) Then, a sixth transition metal film of Ti with a thickness of 4.5 nm is deposited on the fifth dielectric film layer of $Ta_2O_5$ by vacuum coating technology.

9) Then, a sixth dielectric film layer containing $Si_3N_4$ with a thickness of 811 nm is deposited on the sixth transition metal film layer of Ti by vacuum coating technology.

10) Then, a ninth dielectric film layer of $MgF_2$ with a thickness of 833 nm is deposited on the sixth dielectric film layer containing $Si_3N_4$ by vacuum coating technology.

Among them, the preparation method of the high reflecting metal film layer of Au, adhesion layer of Ti, transition metal film layer of Ti, dielectric film layer of $MgF_2$ and dielectric film layer of $Ta_2O_5$ can be one of electron beam evaporation, magnetron sputtering and ion beam sputtering, and the preparation method of the dielectric film layer of $Si_3N_4$ can be one of plasma enhanced chemical vapor deposition and inductively coupled plasma chemical vapor deposition.

Figure 5:
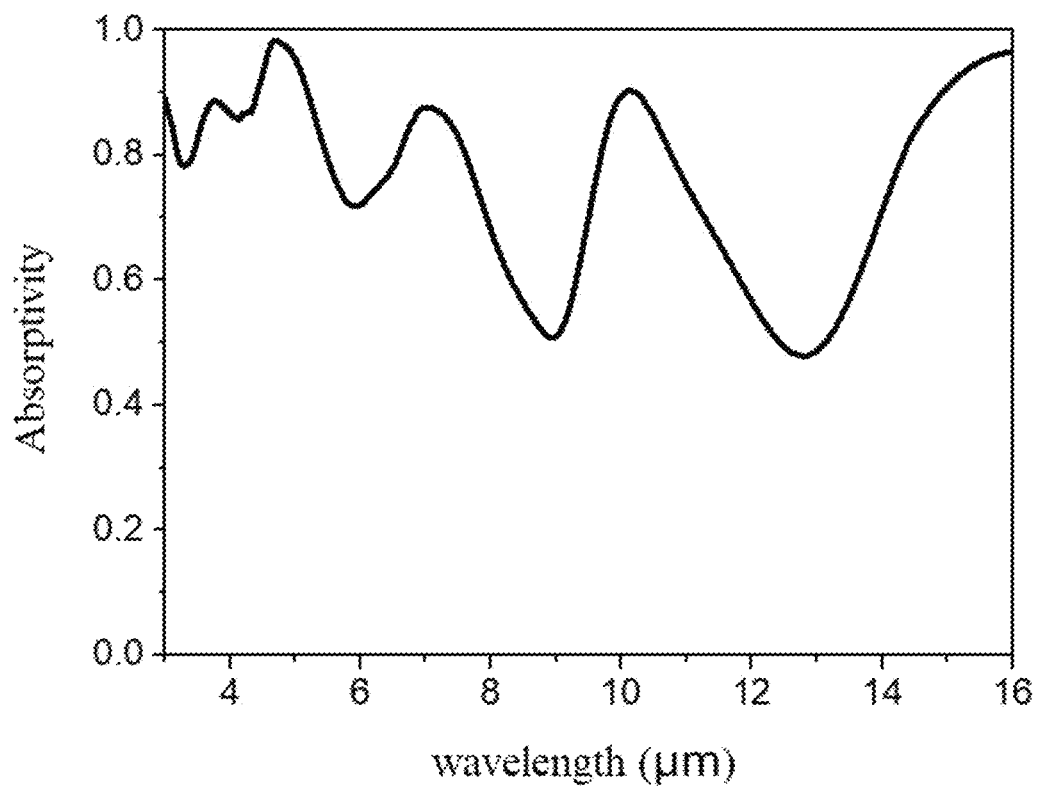
FIG. 5 illustrates an experimental absorption spectrum of an UWB optical absorber with a mid-infrared band when vertical light is incident according to an embodiment of the disclosure.

The absorption spectrum of the prepared UWB optical absorber with the mid-infrared band is shown in FIG. 5. When the incident light is vertically incident on the UWB optical absorber with the mid-infrared band, an average absorption rate at the wavelength in a range of 3 μm to 16 μm (i.e., the mid-infrared band of 3 μm to 16 μm) is greater than 80%.

Embodiment 5

An UWB optical absorber based on multilayer transition metal layers is provided, and its working band is the mid-infrared band. The UWB optical absorber has the structure shown in FIG. 2, which is the same as that in the Embodiment 4, except that the material of the Au high reflecting metal layer is changed to Cr, and the preparation method of the Cr high reflecting metal layer can be selected from one of electron beam evaporation, magnetron sputtering and ion beam sputtering. The remaining steps in the preparation method of the UWB absorber with the mid-infrared band are shown in the Embodiment 4.

Embodiment 6

An UWB optical absorber based on multilayer transition metal layers is provided, and its working band is the mid-infrared band. The UWB optical absorber has the same structure as that of Embodiment 4, except that the material of the Au high reflecting metal layer is changed to Al, and the preparation method of the Al high reflecting metal layer can be one of electron beam evaporation, magnetron sputtering and ion beam sputtering. The remaining steps in the preparation method of the UWB absorber with the mid-infrared band are shown in Embodiment 4.

The above are only the preferred embodiments of the disclosure. Of course, there are many other embodiments of the disclosure. Without departing from the spirit and essence of the disclosure, those skilled in the art can make various corresponding changes and deformations according to the disclosure, such as changing the size, shape or material, etc., but these corresponding changes and deformations should all belong to the scope of protection of the disclosure.

What is claimed is:

1. An ultra wide band (UWB) optical absorber based on multilayer transition metal layers, wherein a working band of the UWB optical absorber comprises one of a visible-near infrared band and a mid-infrared band, and the UWB optical absorber comprises: a substrate and a planar multilayer structure disposed on the substrate;

wherein the planar multilayer structure comprises a high reflecting metal film layer and at least three light absorbing thin film structures disposed on the high reflecting metal film layer; each of the at least three light absorbing thin film structures comprises a transition metal film layer and a dielectric film layer, and a thickness of the transition metal film layer is smaller than that of the dielectric film layer;

wherein a thickness of the UWB optical absorber is less than 3000 nanometers (nm);

wherein the working band of the UWB optical absorber is the mid-infrared band;

wherein the planar multilayer structure comprises three of the at least three light absorbing thin film structures, and the planar multilayer structure is configured as the high reflecting metal film layer, a seventh dielectric film layer, a fourth light absorbing thin film structure, an eighth dielectric film layer, a fifth light absorbing thin film structure, a sixth light absorbing thin film structure and a ninth dielectric film layer sequentially stacked in that order; and wherein a material of the seventh dielectric film layer is $MgF_2$, and a thickness of the seventh dielectric film layer is in a range of 850 nm to 910 nm;

a material of a fourth transition metal film layer of the fourth light absorbing thin film structure is Ti, and a thickness of the fourth transition metal film layer is in a range of 15 nm to 20 nm;

a material of a fourth dielectric film layer of the fourth light absorbing thin film structure is $MgF_2$, and a thickness of the fourth dielectric film layer is in a range of 900 nm to 1000 nm;

a material of the eighth dielectric film layer is tantalic oxide ($Ta_2O_5$), and a thickness of the eighth dielectric film layer is in a range of 120 nm to 160 nm;

a material of a fifth transition metal film layer of the fifth light absorbing thin film structure is Ti, and a thickness of the fifth transition metal film layer is in a range of 15 nm to 20 nm;

a material of a fifth dielectric film layer of the fifth light absorbing thin film structure is $Ta_2O_5$, and a thickness of the fifth dielectric film layer is in a range of 600 nm to 650 nm;

a material of a sixth transition metal film layer of the sixth light absorbing thin film structure is Ti, and a thickness of the sixth transition metal film layer is in a range of 4 nm to 5 nm;

a material of a sixth dielectric film layer of the sixth light absorbing thin film structure is silicon nitride ($Si_3N_4$), and a thickness of the sixth dielectric film layer is in a range of 750 nm to 850 nm; and a material of the ninth dielectric film layer is $MgF_2$, and a thickness of the ninth dielectric film layer is in a range of 800 nm to 900 nm.

2. The UWB optical absorber based on multilayer transition metal layers according to claim 1, wherein a material of the transition metal film layer comprises at least one selected from a group consisting of titanium (Ti), chromium (Cr) and platinum (Pt).

3. The UWB optical absorber based on multilayer transition metal layers according to claim 1, wherein a material of the dielectric film layer comprises one selected from a group consisting of magnesium fluoride ($MgF_2$) and silicon oxide ($SiO_2$).

4. The UWB optical absorber based on multilayer transition metal layers according to claim 1, wherein a material of the high reflecting metal film layer comprises at least one selected from a group consisting of aurum (Au), aluminum (Al) and chromium (Cr).

5. The UWB optical absorber based on multilayer transition metal layers according to claim 4, wherein a thickness of the high reflecting metal film layer is greater than 50 nm.

6. The UWB optical absorber based on multilayer transition metal layers according to claim 1, wherein the substrate comprises one selected from a group consisting of silicon slices, $SiO_2$ glass, polished Al slices and polyethylene glycol terephthalate (PET) plastic.

7. An UWB optical absorber based on multilayer transition metal layers, comprising:

a substrate (11) and a planar multilayer structure disposed on the substrate (11);

wherein a working band of the UWB optical absorber is a mid-infrared band, and a thickness of the UWB optical absorber is less than 3000 nm;

wherein the planar multilayer structure is configured as a reflecting metal film layer (12), a fourth dielectric film layer (13), a first light absorbing thin film structure including a first transition metal film layer (14) and a first dielectric film layer (15), a fifth dielectric film layer (16), a second light absorbing thin film structure including a second transition metal film layer (17) and a second dielectric film layer (18), a third light absorbing thin film structure including a third transition metal film layer (19) and a third dielectric film layer (20), and a sixth dielectric film layer (21) sequentially stacked in that order; and wherein a material of the fourth dielectric film layer (13) is MgF$_2$, and a thickness of the fourth dielectric film layer (13) is in a range of 850 nm to 910 nm;

a material of the first transition metal film layer (14) is Ti, and a thickness of the first transition metal film layer (14) is in a range of 15 nm to 20 nm;

a material of the first dielectric film layer (15) is MgF$_2$, and a thickness of the first dielectric film layer (15) is in a range of 900 nm to 1000 nm;

a material of the fifth dielectric film layer (16) is Ta$_2$O$_5$, and a thickness of fifth dielectric film layer (16) is in a range of 120 nm to 160 nm;

a material of the second transition metal film layer (17) is Ti, and a thickness of the second transition metal film layer (17) is in a range of 15 nm to 20 nm;

a material of the second dielectric film layer (18) is Ta$_2$O$_5$, and a thickness of the second dielectric film layer (18) is in a range of 600 nm to 650 nm;

a material of the third transition metal film layer (19) is Ti, and a thickness of the third transition metal film layer (19) is in a range of 4 nm to 5 nm;

a material of the third dielectric film layer (20) is Si$_3$N$_4$, and a thickness of the third dielectric film layer (20) is in a range of 750 nm to 850 nm; and a material of the sixth dielectric film layer (21) is MgF$_2$, and a thickness of the sixth dielectric film layer (21) is in a range of 800 nm to 900 nm.

8. The UWB optical absorber based on multilayer transition metal layers according to claim 7, wherein a material of the reflecting metal film layer (12) comprises at least one selected from a group consisting of aurum (Au), aluminum (Al) and chromium (Cr).

9. The UWB optical absorber based on multilayer transition metal layers according to claim 8, wherein a thickness of the reflecting metal film layer (12) is greater than 50 nm.

10. The UWB optical absorber based on multilayer transition metal layers according to claim 7, wherein the substrate (11) comprises one selected from a group consisting of silicon slices, SiO$_2$ glass, polished Al slices and PET plastic.

* * * * *